(12) United States Patent
Kakishita

(10) Patent No.: US 7,783,053 B2
(45) Date of Patent: Aug. 24, 2010

(54) LEVEL METER DISPLAYING METHOD AND LEVEL METER APPARATUS

(75) Inventor: Masahiro Kakishita, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1339 days.

(21) Appl. No.: 10/883,296

(22) Filed: Jun. 30, 2004

(65) Prior Publication Data

US 2005/0008164 A1   Jan. 13, 2005

(30) Foreign Application Priority Data

Jul. 1, 2003   (JP) .............................. 2003-189202

(51) Int. Cl.
  *H04R 29/00*   (2006.01)
(52) U.S. Cl. ............................... 381/56; 73/645; 73/646
(58) Field of Classification Search .................. 73/570, 73/645–648; 324/76.1, 132, 158.1, 110, 324/114–115; 381/56, 58, 77
  See application file for complete search history.

(56) References Cited

U.S. PATENT DOCUMENTS

| | | | | |
|---|---|---|---|---|
| 3,089,561 A | * | 5/1963 | Michael et al. ................ | 73/648 |
| 3,268,813 A | * | 8/1966 | Pendleton .................... | 324/132 |
| 3,634,761 A | * | 1/1972 | Day ......................... | 324/76.66 |
| 3,991,628 A | * | 11/1976 | Narita ........................ | 73/647 |
| 4,102,208 A | * | 7/1978 | Betz .......................... | 73/647 |
| 4,131,846 A | * | 12/1978 | Stone ......................... | 324/132 |
| 4,424,511 A | * | 1/1984 | Alberts, Jr. ................... | 73/646 |
| 4,620,445 A | * | 11/1986 | McKendree et al. .......... | 73/647 |
| 6,195,029 B1 | | 2/2001 | Urry et al. | |
| 7,308,105 B2 | * | 12/2007 | Bullen ........................ | 381/57 |
| 2004/0247136 A1 | * | 12/2004 | Wallace ....................... | 381/56 |

FOREIGN PATENT DOCUMENTS

| | | |
|---|---|---|
| JP | 2006761 | 1/1990 |
| JP | 7037469 | 2/1995 |
| JP | 2001-208569 | 8/2001 |

OTHER PUBLICATIONS

Title: Calculus, Author: Gilbert Strang, Publisher: Wellesley-Cambridge Press, published:1991.*

* cited by examiner

*Primary Examiner*—Vivian Chin
*Assistant Examiner*—Fatimat O Olaniran
(74) *Attorney, Agent, or Firm*—Morrison & Foerster LLP

(57) ABSTRACT

A level meter displaying method which is capable of changing the rate of change in the angle or position of an indicator in at least one particular input signal level range. A scale image obtained according to a function which nonlinearly varies with a signal level of the sound signal is displayed on a display. The signal level of the sound signal is converted into an indicator angle or indicator position of the level meter according to the function. A level image corresponding to the resulting indicator angle or indicator position is displayed on the display. A curve having at least two inflection points each of which is a boundary between a region where a rate of change of the indicator angle or the indicator position to be converted according to the function is larger, and a region where the indicator angle or the indicator position is smaller is generated by the function.

11 Claims, 6 Drawing Sheets

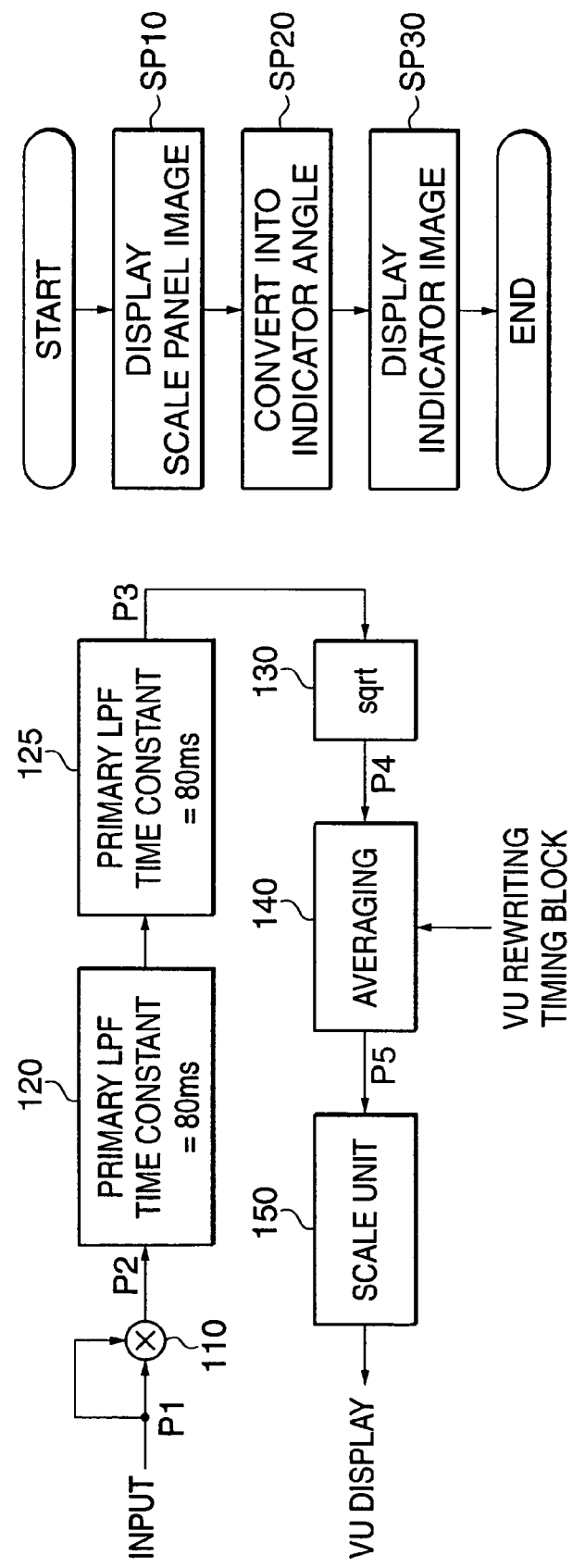

LEVEL METER DISPLAYING METHOD AND LEVEL METER APPARATUS

BACKGROUND OF THE INVENTION

1. Field of the Invention

The present invention relates to a level meter displaying method and a level meter apparatus which can be suitably applied to a VU (Volume Unit) meter for use in audio equipment.

2. Description of the Related Art

VU (Volume Unit) meters used in audio equipment are capable of displaying the average level of a sound signal in the range from a low level of not greater than −20 dB to such an excessive input level of +3 dB (refer to FIG. 1A). VU meters and other ordinary indicator type analog voltmeters are configured such that the input voltage and the rotational angle of an indicator are proportional to each other. Therefore, if the manufacturer of a VU meter defines two reference points consisting of a decibel value at an indicator angle of 90° and an indicator angle at −20 dB, indicator angles for other decibel values are uniquely determined. This will now be concretely described with reference to a characteristic diagram of FIG. 1B showing a conversion line which represents the relationship between indicator angles and ratios of input signal voltages to the reference level. In FIG. 1B, the abscissa indicates the voltage ratio of the input signal voltage to the reference level, and is graduated at regular intervals from 0 times to $\sqrt{2}$ times (3 dB) of the reference level. On the other hand, the ordinate indicates the indicator angle, and is graduated from 0 to 150 degrees. For example, if the manufacturer of the VU meter sets an indicator angle of 138° for −20 dB, i.e. a voltage ratio of 0.1, and sets an indicator angle of 90° for −3 dB, an indicator angle of 34° is uniquely determined for +3 dB, i.e. a voltage ratio of $\sqrt{2}$.

Here, it is assumed that a rhythm tone signal is input to the VU meter configured as described above. FIG. 2A is a waveform chart showing a rhythm tone signal which is normalized such that the possible maximum value of positive and negative vibrations lies inside a range of ±100%, and is input to the VU meter. The peak of the signal is at a full scale (100%) of 0 dB, but the average absolute value of signal levels is as low as around −20 dB.

This raises the problem that the indicator of the VU meter constantly indicates values around −20 dB in FIG. 1A, and the position of the indicator is hardly changed from the left end.

Therefore, to increase the rate of change in the position of the indicator at such a low level as −20 dB, it can be envisaged that an indicator angle of 90° is set for −6 dB, and an indicator angle of 145° is set for −40 dB as shown in a characteristic diagram of FIG. 2B. This raises the problem that although a signal level of 0 dB is set for an indicator angle 34°, the indicator angle is −12° below a horizontal line corresponding to 0° at such an excessive input level as 3 dB, and hence lies outside a normal voltmeter indication range. Namely, the conventional level meter cannot change the rate of change in indicator angle in a particular input signal level range such as a low level range. It should be noted that FIG. 2C shows the positional relationship between a plurality of indicator angles corresponding to decibel values (−40 dB, −6 dB, 0 dB, and 3 dB) at main points. In FIG. 2C, positive indicator angles are shown counterclockwise in order with the indicator angle corresponding to the horizontal line being assumed to be 0°.

SUMMARY OF THE INVENTION

It is therefore an object of the present invention to provide a level meter displaying method and a lever meter apparatus which are capable of changing the rate of change in the angle or position of an indicator in at least one particular input signal level range.

To attain the above object, in a first aspect of the present invention, there is provided a level meter displaying method of displaying a level meter on a display of a device to which a sound signal is input comprises a displaying step of displaying on the display a scale image obtained according to a function which nonlinearly varies with a signal level of the sound signal, a converting step of converting the signal level of the sound signal into an indicator angle or indicator position of the level meter according to the function, and a level image displaying step of displaying on the display a level image corresponding to the indicator angle or indicator position obtained in the converting step, wherein the function generates a curve having at least two inflection points each of which is a boundary between a region where a rate of change of the indicator angle or the indicator position to be converted according to the function is larger, and a region where the indicator angle or the indicator position is smaller.

According to the first aspect of the present invention, a scale image obtained according to a function which nonlinearly varies with a signal level of the sound signal is displayed on the display, the signal level of the sound signal is converted into an indicator angle or an indicator position of the level meter according to the function, and a level image corresponding to the resulting indicator angle or indicator position is displayed on the display. As a result, the rate of change in indicator angle or indicator position can be changed in a particular signal level range. Also, the rate of change in indicator angle or indicator position in a plurality of signal level ranges can be increased.

To attain the above object, in a second aspect of the present invention, there is provided a level meter displaying method of displaying a level meter on a display of a device to which a sound signal is input comprises a displaying step of displaying on the display a scale image obtained according to a function which nonlinearly varies with a signal level of the sound signal, a converting step of converting the signal level of the sound signal into an indicator angle or indicator position of the level meter according to the function, and a level image displaying step of displaying on the display a level image corresponding to the indicator angle or indicator position obtained in the converting step, wherein the function is an nth order function determined by not less than "n+1" (n is a natural number of not less than 2) points of the signal level of the sound signal and the indicator angle or the indicator position corresponding to the points of the signal level.

According to the second aspect of the present invention, the rate of change in indicator angle or indicator position in a plurality of signal level ranges can be increased.

To attain the above object, in a third aspect of the present invention, there is provided a level meter displaying method of displaying a level meter on a display of a device to which a sound signal is input comprises a displaying step of displaying on the display a scale image obtained according to a function which nonlinearly varies with a signal level of the sound signal, a converting step of converting the signal level of the sound signal into an indicator angle or indicator position of the level meter according to the function, and a level image displaying step of displaying on the display a level image corresponding to the indicator angle or indicator position obtained in the converting step, wherein the function generates a curve configured such that a range in which a gradient as a rate of change of the indicator angle or the indicator position to be converted according to the function is larger, and a range in which the gradient is smaller are alternately repeated.

According to the third aspect of the present invention, the rate of change in indicator angle or indicator position in a plurality of signal level ranges can be increased.

Preferably, a level meter displaying method comprises a setting step of setting a right angle with respect to a horizontal position of the level meter for an average signal level of the sound signal.

Preferably, the setting step comprises setting respective predetermined angles with respect to the horizontal position of the level meter for a maximum signal level and a minimum signal level of the sound signal.

Preferably, the setting step comprises setting respective predetermined angles with respect to the horizontal position of the level meter for a maximum signal level and a minimum signal level of the sound signal.

Preferably, the function is a nonlinear function which generates a curve passing though three points consisting of the maximum signal level, the average signal level, and the minimum signal level of the sound signal.

Preferably, the nonlinear function is a quadratic function.

To attain the above object, in a fourth aspect of the present invention, there is provided a level meter apparatus comprises a display section that displays a level meter, an input section to which a sound signal is externally input, a scale display section that displays on the display section a scale image obtained according to a function which nonlinearly varies with a signal level of the sound signal, a converting section that converts the signal level of the sound signal into an indicator angle or indicator position of the level meter according to the function, and a level image display section that displays on the display section a level image corresponding to the indicator angle or indicator position obtained by the converting section, wherein the function generates a curve having at least two inflection points each of which is a boundary between a region where a rate of change of the indicator angle or the indicator position to be converted according to the function is larger, and a region where the indicator angle or the indicator position is smaller.

To attain the above object, in a fifth aspect of the present invention, there is provided a level meter apparatus comprises a display section that displays a level meter, an input section to which a sound signal is externally input, a scale display section that displays on the display section a scale image obtained according to a function which nonlinearly varies with a signal level of the sound signal, a converting section that converts the signal level of the sound signal into an indicator angle or indicator position of the level meter according to the function, and a level image display section that displays on the display section a level image corresponding to the indicator angle or indicator position obtained by the converting section, wherein the function is an nth order function determined by not less than "n+1" (n is a natural number of not less than 2) points of the signal level of the sound signal and the indicator angle or the indicator position corresponding to the points of the signal level.

To attain the above object, in a sixth aspect of the present invention, there is provided a level meter apparatus comprises a display section that displays a level meter, an input section to which a sound signal is externally input, a scale display section that displays on the display section a scale image obtained according to a function which nonlinearly varies with a signal level of the sound signal, a converting section that converts the signal level of the sound signal into an indicator angle or indicator position of the level meter according to the function, and a level image display section that displays on the display section a level image corresponding to the indicator angle or indicator position obtained by the converting section, wherein the function generates a curve configured such that a range in which a gradient as a rate of change of the indicator angle or the indicator position to be converted according to the function is larger, and a range in which the gradient is smaller are alternately repeated.

Preferably, a level meter apparatus comprises a setting section that sets a right angle with respect to a horizontal position of the level meter for an average signal level of the sound signal.

Preferably, the setting section sets setting respective predetermined angles with respect to the horizontal position of the level meter for a maximum signal level and a minimum signal level of the sound signal.

Preferably, the function is a nonlinear function which generates a curve passing though three points consisting of the maximum signal level, the average signal level, and the minimum signal level of the sound signal.

Preferably, the nonlinear function is a quadratic function.

Preferably, the nonlinear function is a function comprising two straight lines, and a curve which is obtained by interpolating the two straight lines.

The above and other objects, features, and advantages of the invention will become more apparent from the following detailed description taken in conjunction with the accompanying drawings.

BRIEF DESCRIPTION OF THE DRAWINGS

FIG. 4A is a block diagram schematically showing the entire construction of a DSP included in the effect device in FIG. 3;

FIG. 4B is a flow chart showing a timer interrupt process in which the display of a VU meter is sequentially written;

DETAILED DESCRIPTION OF THE PREFERRED EMBODIMENTS

Figure 1A:
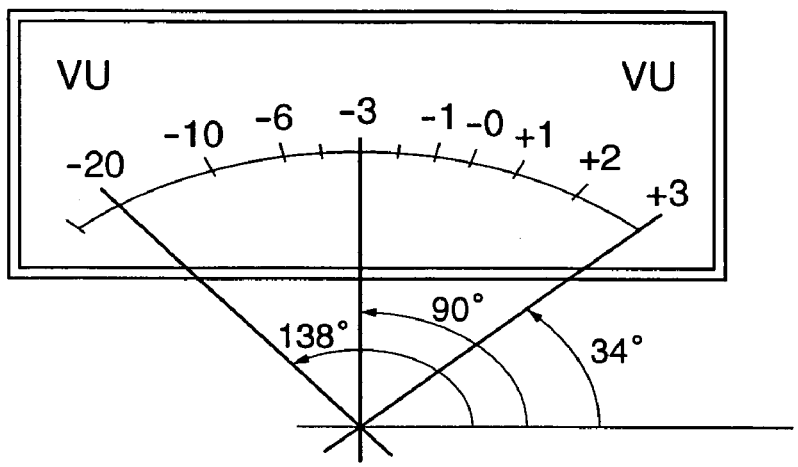
FIG. 1A is a view showing an example of display on a conventional VU meter.
Figure 1B:
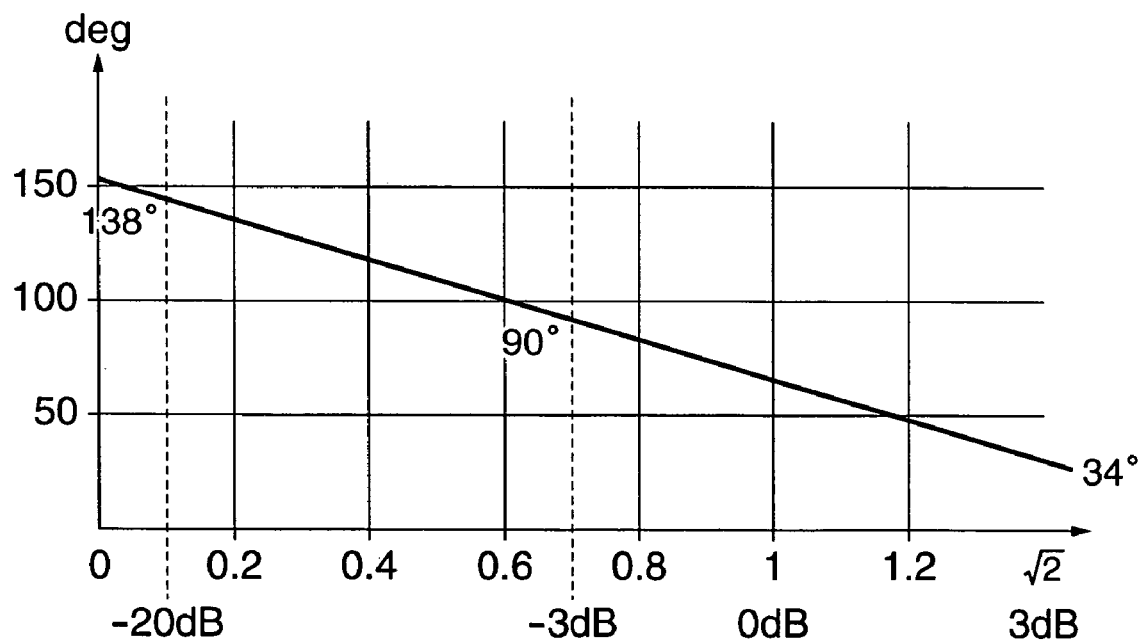
FIG. 1B is a characteristic diagram showing a conversion line which represents the relationship between indicator angles of the conventional VU meter and ratios of input signal voltages to a reference level.

The present invention will now be described in detail below with reference to the drawings showing preferred embodiments thereof. In the drawings, elements and parts which are identical throughout the views are designated by identical reference numerals, and duplicate description thereof is omitted.

Figure 3:
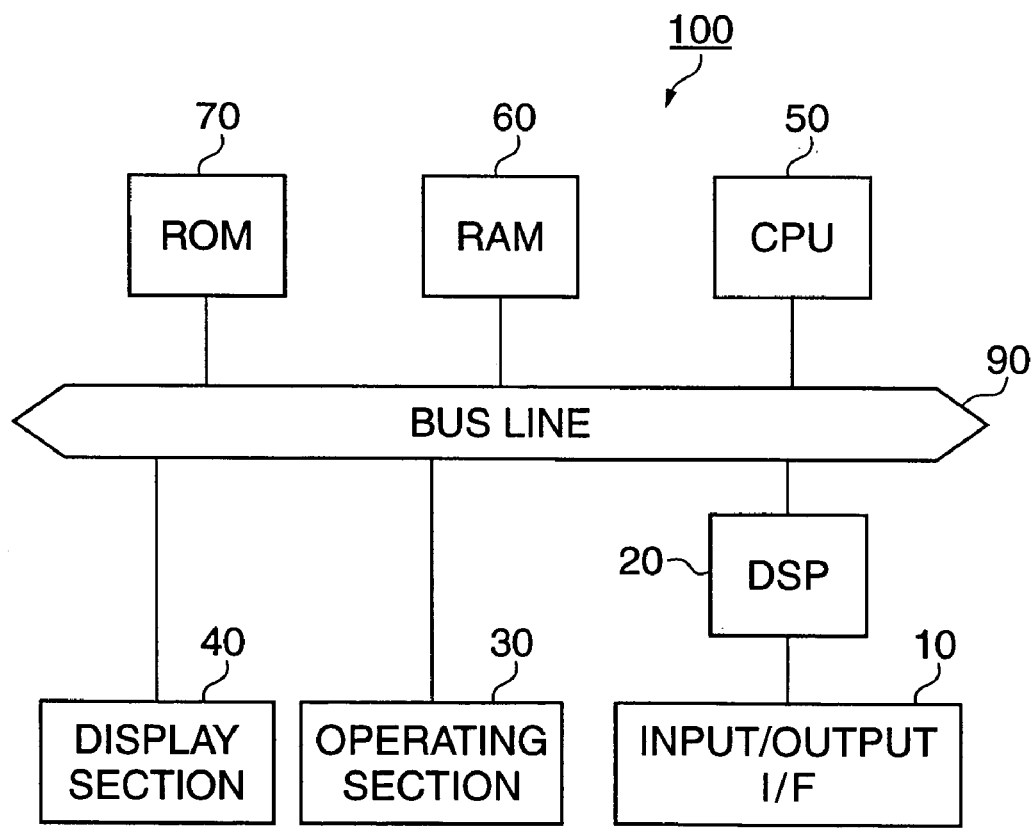
FIG. 3 is a diagram showing the hardware configuration of an effect device to which a level meter displaying method according to a first embodiment of the present invention is applied.

FIG. 3 is a view showing the hardware configuration of an effect device to which a level meter displaying method according to a first embodiment of the present invention is applied.

In FIG. 3, reference numeral 10 denotes an input/output interface 10 which provides interface for input and output of sound signals (including a musical tone signal) to and from musical tone equipment, not shown. The input/output interface 10 is provided with input terminals and output terminals such that a microphone and musical tone equipment such as an electronic musical instrument can be connected to the input/output interface 10 via the input terminals and the output terminals.

Reference numeral 20 denotes a DSP which performs digital signal processing on sound signals input via the input/output interface 10. Reference numeral 30 denotes an operating section provided with various switches, a keyboard, and a mouse. Reference numeral 40 denotes a display section implemented by a liquid crystal display panel, on which a VU meter image, described later, is to be displayed. Reference numeral 50 denotes a CPU which controls the overall operation of the effect device. Reference numeral 60 denotes a RAM which serves as a working memory. Reference numeral 70 denotes a flash ROM which stores control programs and various parameters. Reference numeral 90 denotes a bus line, which connects the component parts 10, 20, 30, 40, 50, 60, and 70 to each other. The above-mentioned component parts constitute the effect device 100 according to the present embodiment.

The effect device 100 applies effects to an input sound signal using the DSP 20. The effect device 100 is capable of applying the same effects to a sound signal as those applied to a sound signal by a tape deck.

Also, the effect device 100 carries out a sequential process in which the signal level of a sound signal is sequentially calculated, a converting process in which the signal level is converted into the indicator angle of a VU meter as a level meter according to rules which will be described later, and a displaying process in which a VU meter image representative of the indicator angle is displayed in the display section 40. A description will now be given of the sequential process carried out by the DSP 20 and the displaying process carried out by the CPU 50.

Referring first to FIG. 4A, a description will be given of the sequential process in which the signal level of a sound signal is sequentially calculated.

FIG. 4A is a diagram schematically showing the entire construction of the DSP 20. A multiplier 110 squares a sound signal P1. Primary LPFs 120 and 125 smooth an output signal P2 from the multiplier 110 using a time constant of 80 msec. A square-root calculator 130 calculates the square root of an output signal P3 from the primary LPFs 120 and 125 connected in cascade. The above sequence obtains a signal corresponding to the absolute value of the sound signal P1. An averaging unit 140 averages the level of an output signal P4 from the square root calculator 130 for each sampling block. The above sequence calculates the signal level of the sound signal P1. A scale unit 150 converts an output signal PS from the averaging unit 140, which represents the signal level of the sound signal P1 into the indicator angle of the VU meter according to conversion rules, described later, in accordance with an instruction from the CPU 50.

Referring next to a flow chart of FIG. 4B, a description will be given of a process in which the DSP 20 converts the signal level of the sound signal P1 into the indicator angle of the level meter and displays a VU meter image representative of the obtained indicator angle in the display section 40, according to an instruction from the CPU 50.

The manufacturer of the VU meter preliminarily sets a total of three reference points, i.e. sets an indicator angle of 145° counterclockwise from the horizontal position for a signal level of −40 dB, sets an indicator angle of 90° or a right angle with respect to the horizontal position for a signal level of −6 dB, and sets an indicator angle of 35° counterclockwise from the horizontal position for a signal level of +3 dB. Also, the manufacturer of the VU meter sets the signal level of −40 dB as the minimum signal level to be displayed on the VU meter, the signal level of −6 dB as the average signal level to be displayed on the VU meter, and the signal level of +3 dB as the minimum signal level to be displayed on the VU meter, and stores these settings or set signal levels in the RAM 60.

Further, the manufacturer of the VU meter calculates values a, b, and c of the following quadratic function using the above three set signal levels:

$$y=ax^2+bx+c \quad (1)$$

It should be noted that the values a, b, and c are stored in the ROM 70.

Next, a timer interrupt process in FIG. 4B is executed by a timer interrupt, in which the display of the VU meter is sequentially rewritten.

In a step SP10, a scale panel image (scale image) is displayed. For example, in accordance with the above described settings, the CPU 50 causes the display section 40 to display a scale panel image. Specifically, the CPU 50 determines the quadratic function (1) as a function y which nonlinearly varies according the three set signal levels, and causes the display section 40 to display a scale panel image obtained according to the determined function y. The scale panel image contains a character string "−40 dB" displayed at the position of the 145° indicator angle, a character string "−6 dB" displayed at the position of the 90° indicator angle, and a character string "+3 dB" displayed at the position of the 35° indicator angle. Here, the scale panel image contains character strings indicative of scales of other signal levels as well as the three signal levels set in advance. The positions where these character strings are displayed are determined according to the quadric function y.

Figure 5A:
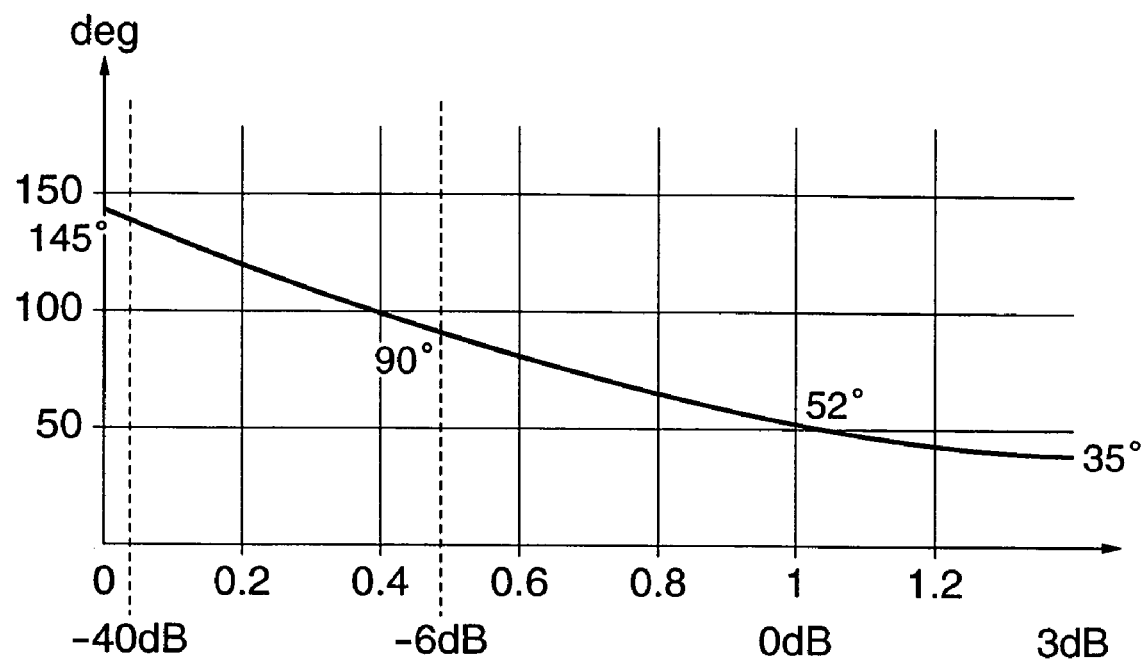
FIG. 5A is a characteristic diagram showing a conversion curve which represents the relationship between voltage ratios (decibel values) over the entire signal level range and indicator angles.

Then, the process proceeds to a step SP20 wherein the DSP 20 converts the signal level into the indicator angle of the VU meter using the quadric function y. On this occasion, the CPU 50 instructs the scale unit 150 in FIG. 4A to carry out the converting process. FIG. 5A is a characteristic diagram showing a conversion curve which represents the relationship between voltage ratios (decibel values) over the entire signal level range and indicator angles. In FIG. 5A, the indicator angle is 52° when the voltage ratio is "0 dB"; as the signal level becomes lower, the curve gradient becomes greater. The conversion curve is a quadratic function, and hence the rate of change in gradient is constant.

Figure 5B:
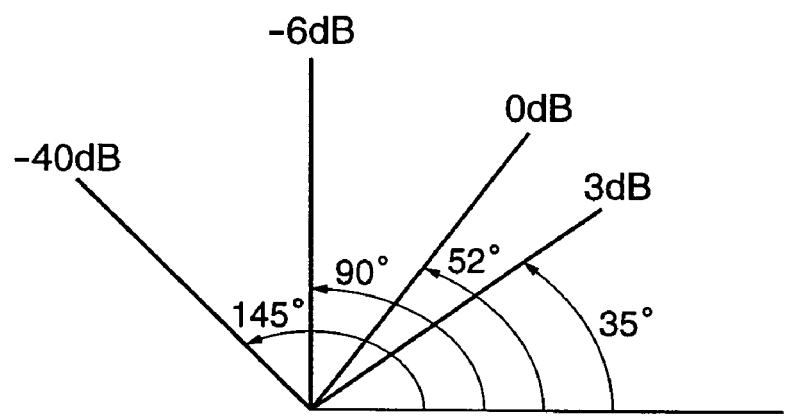
FIG. 5B is a view showing the positional relationship between the decibel values and the indicator angles shown in FIG. 5A.

Then, the process proceeds to a step SP30 wherein the CPU 50 loads information indicative of the indicator angle, which has been obtained by the converting process, from the scale unit 150 into the RAM 60, and causes the display section 40 to display an indicator image corresponding to the information indicative of the indicator angle. As a result, the indicator image as well as the scale panel image displayed in the step SP10 are displayed in the display section 40. It should be noted that FIG. 5B shows the positional relationship between the decibel values and the indicator angles shown in FIG. 5A.

Figure 2A:
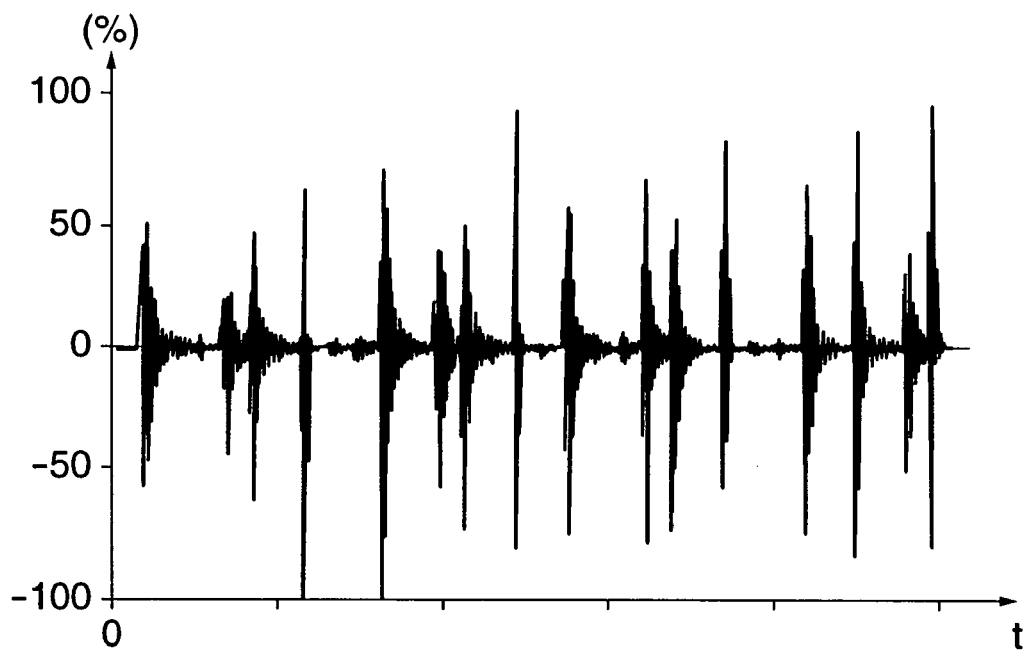
FIG. 2A is a waveform chart showing a rhythm tone signal which is input to the conventional VU meter, the rhythm tone signal being normalized such that the possible, maximum value of positive and negative vibrations lies inside a range of ±100%.
Figure 2B:
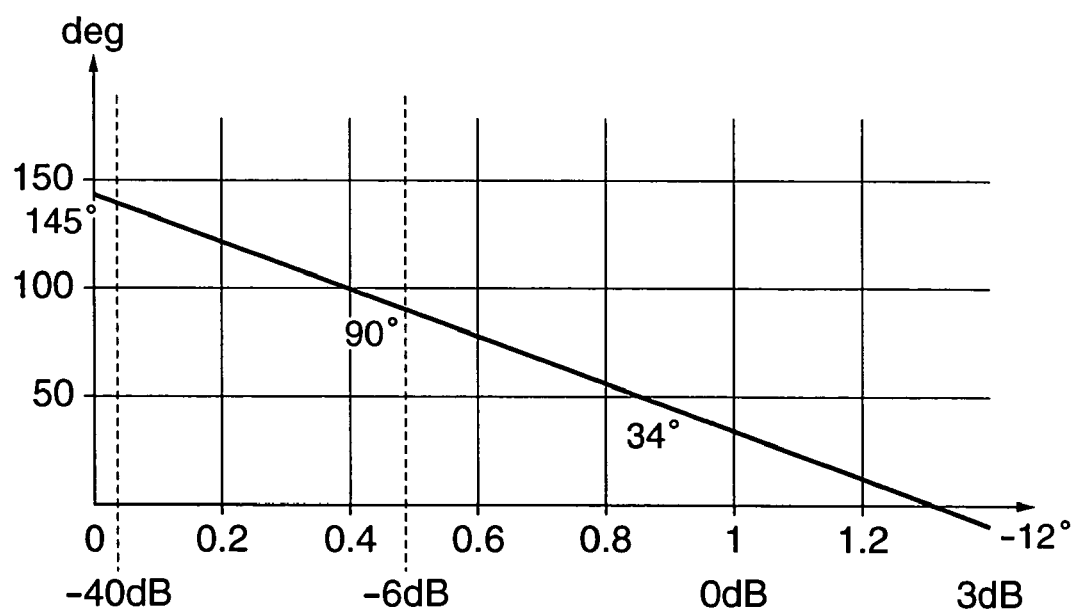
FIG. 2B is a characteristic diagram showing a conversion line which represents the relationship between indicator angles of the conventional VU meter and ratios of input signal voltages to a reference level with an indication range around −20 dB being enlarged.
Figure 2C:
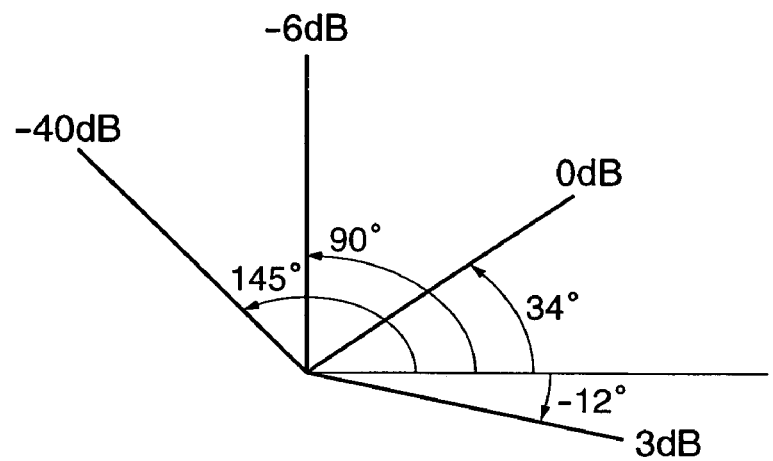
FIG. 2C is a view showing the positional relationship between a plurality of decibel values of the VU meter in FIG. 2B and a plurality of indicator angles corresponding to the decibel values.

As described above, according to the present embodiment, the rate of change in indicator angle in a particular range such as a low level range can be increased, and hence the indicator angle can be changed to a relatively large degree even for a signal with a high peak voltage and a low average level, such as a rhythm tone signal shown in FIG. 2A.

A description will now be given of a second embodiment of the present invention with reference to FIGS. 6A and 6B.

In the first embodiment described above, the signal level is converted into the indicator angle using the quadratic function, but this conversion may be carried out using a function comprised of a plurality of straight lines and a curve obtained by interpolating the straight lines. It should be noted that the hardware configuration of the effect device 100, the algorithm configuration, and the sequential process carried out by the DSP 20 according to the second embodiment are the same as those of the first embodiment, and therefore description thereof is omitted, and a converting process and a VU meter displaying process will be described with reference to a characteristic diagram of FIG. 6A and the flow chart of FIG. 4B.

Figure 6A:
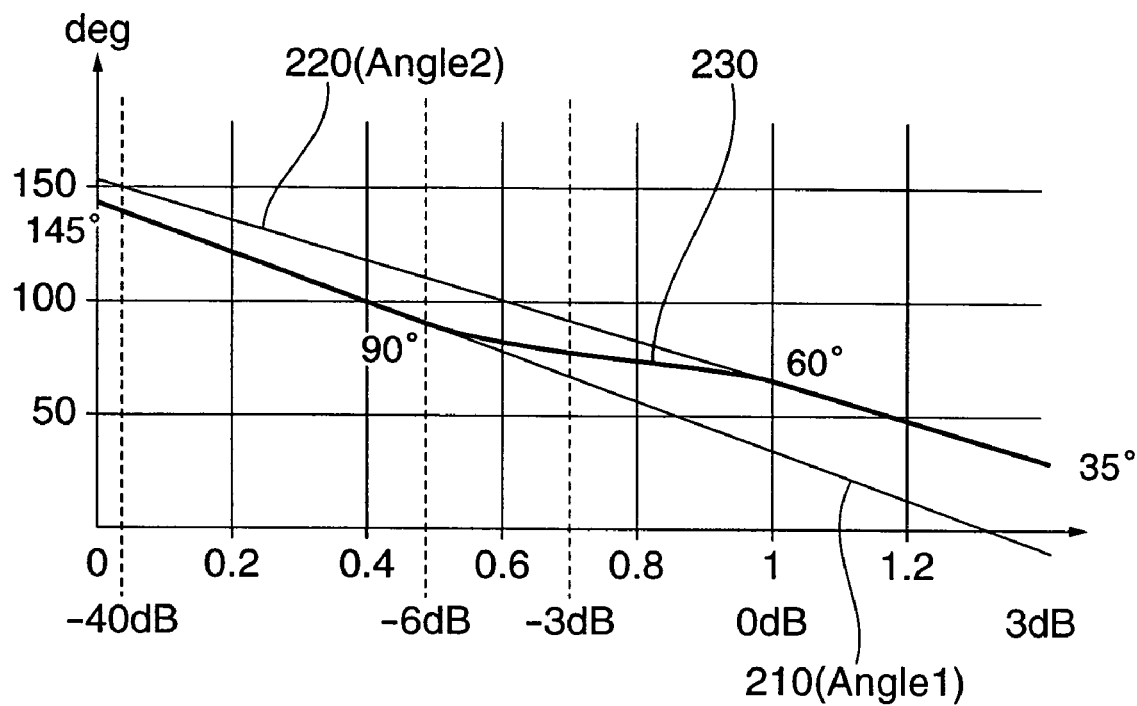
FIG. 6A is a characteristic diagram showing a conversion curve which represents the relationship between voltage ratios (decibel values) over the entire signal level range and indicator angles according to a second embodiment of the present invention.
Figure 6B:
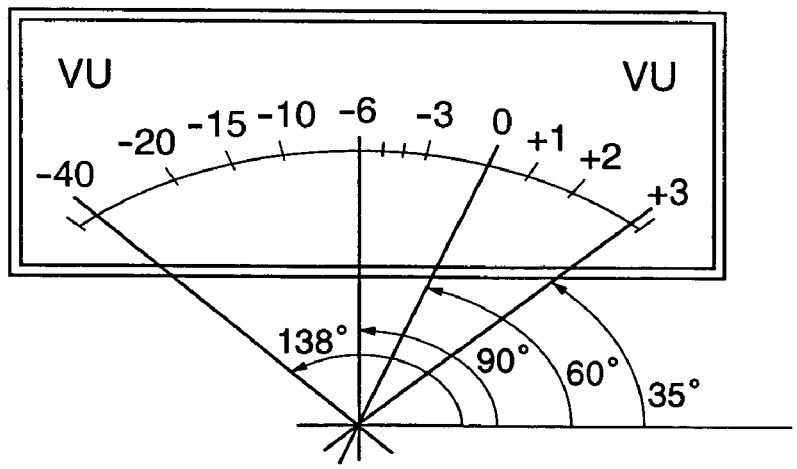
FIG. 6B is a view showing an example of actual display on a VU meter.

The manufacturer of the effect device 100 sets a straight line 210 by setting an indicator angle of 90° for a signal level of −6 dB and an indicator angle of 145° for a signal level of −40 dB, and sets a straight line 220 with a gradient different from the gradient of the straight line 210 by setting an indicator angle of 90° for a signal level of −3 dB and an indicator angle of 145° for a signal level of −20 dB in advance (refer to FIG. 6A). Here, the straight line 220 indicates an indicator angle of 60° at 0 dB. It should be noted that the gradients of the straight lines 210 and 220 and the indicator angle at the signal level of −40 dB are stored in the ROM 70.

Then, the timer interrupt process in FIG. 4B is executed by a timer interrupt, in which the display of the VU meter is sequentially rewritten.

In the step SP10, a scale panel image is displayed. For example, in accordance with the above described settings, the CPU 50 causes the display section 40 to display a scale panel image. The scale panel image contains a character string "−40 dB" displayed at the position of the 145° indicator angle, a character string "−6 dB" displayed at the position of the 90° indicator angle, and a character string "0 dB" displayed at the position of the 60° indicator angle.

Then, the process proceeds to the step SP20 wherein the signal level is converted into the indicator angle of the VU meter. Namely, the DSP 20 is instructed to carry out the converting process. As a result, the scale unit 150 converts a signal level of less than "−6 dB" into the corresponding indicator angle according to the straight line 210 in FIG. 6A. Also, an excessive signal input level of not less than "0 dB" is converted into the corresponding indicator angle according to the straight line 220 in FIG. 6A. Further, the straight lines 210 and 220 are interpolated according to the following equations (2) and (3), so that a signal level within the range from "−6 dB (0.5 times)" to "0 dB (1 times)" is converted into the corresponding indicator angle:

$$\text{Angle}=(1-rr)\times\text{Angle1}+rr\times\text{Angle2} \quad (2)$$

$$rr=\min(1,\max(0,2\times(in-0.5))) \quad (3)$$

The interpolated or converted indicator angle can be calculated according to equation (2), where "Angle 1" indicates the indicator angle calculated using the straight line 210, "Angle 2" indicates the indicator angle calculated using the straight line 220, and "rr" is determined by equation (3), where "in" indicates the input voltage ratio, which is the voltage ratio of signal level to the reference level, "min( )" is the minimum value of the two values in the parentheses, namely, a value of one (1) and a value equal to "max( )" which is the maximum value of the two values in the parentheses, i.e., a value of zero (0) and a value of (in−0.5) multiplied by 2. FIG. 6A shows a curve 230 which is obtained by interpolating the straight lines 210 and 220 within the range from "−6 dB:" to "0 dB".

As is clear from the curve 230 in FIG. 6A, the gradient is large within the range of input voltage ratio from −40 dB and −6 dB, the gradient is small within the range of input voltage ratio from −6 dB to 0 dB, and the gradient is again large within the range of input voltage ratio from 0 dB to 3 dB. Namely, the curve 230 has two inflection points, each of which is a boundary between a region where the rate of change in indicator angle is larger and the rate of change in indicator angle is smaller. In the illustrated example, as the signal level becomes lower, the gradient of the indicator angle increases.

The process then proceeds to the step SP30 wherein an indicator image is displayed in the display section 40. It should be noted that an example of actual display of the VU meter is shown in FIG. 6B so as to recognize the positional relationship between indicator angles at a first glance.

As described above in detail, according to the present embodiment, the rate of change in indicator angle in a plurality of signal level ranges (e.g. such a low level range as not greater than "−6 dB" and such an excessively saturated level as not less than "0 dB") can be increased.

It should be understood that the present invention is not limited to the embodiments described above, but various changes in or to the above described embodiments may be possible without departing from the spirits of the present invention, including changes as described below.

(1) Although in the above described first and second embodiments, an indicator type analog meter is used, the present invention may be applied to a bar graph type analog meter. In this case, signal levels are displayed at respective bar indicator positions.

(2) Although in the above described first and second embodiments, the decibel value of input voltage is converted into the indicator angle using a nonlinear function (quadratic expression) or by interpolation of two straight lines, the present invention is not limited to this, but the decibel value of input voltage may be converted into the indicator angle by referring to a table which shows a quadratic expression or two straight lines and data on interpolation of the two straight lines, which are stored in advance in the ROM 70.

(3) Although in the above described first and second embodiments, the decibel value of input voltage is converted into the indicator angle using a nonlinear function (quadratic expression) or by interpolation of two straight lines, the present invention is not limited to this, but a two-dimensional graph showing signal levels and indicator angles may be displayed in the display section 40, with indicator characteristics being plotted on the graph so that the indicator characteristics can be freely programmed.

(4) Although in the above described first embodiment, a quadratic expression is used to convert the decibel value of input voltage into the indicator angle, an nth order expression may be used. In this case as well, a conversion curve obtained by the nth order expression may be such that a range in which the gradient is larger and a range in which the gradient is smaller are alternately repeated. Also, the conversion curve may contain two or more inflection points, each of which is a boundary between a region where the rate of change in indicator angle is larger and the rate of change in indicator angle is smaller.

(5) Although in the above described second embodiment, two straight lines are interpolated, three or more straight lines may be interpolated. In this case, the range of signal levels is divided into four or more ranges, and a range in which the gradient is larger and a range in which the gradient is smaller may be alternately repeated.

(6) Although in the above described second embodiment, the equations (2) and (3) are used to interpolate two straight lines, an nth order equation may be used. In this case, the nth order equation is determined so that indicator angles at respective one ends of straight lines which define respective divided ranges are continuous from each other, and the rates of change in these indicator angles are also continuous from each other.

(7) Although in the above described first and second embodiments, the decibel value of input voltage is converted into the indicator angle using a nonlinear function (a quadratic expression) or a curve which is obtained by interpolating two straight lines so as to increase the rate of change in indicator angle in the vicinity of −20 dB, the rate of change in the vicinity of around 0 to 3 dB may be increased to make it easier to recognize a saturated state. Also, the rate of change in indicator angle corresponding to the central point of a display unit of the VU meter may be increased.

(8) Although in the above described first and second embodiments, the decibel value of input voltage is converted into the indicator angle using a nonlinear function (a quadratic expression) or by interpolation of two straight lines, the decibel value of input voltage may be converted into the indicator position (i.e. the indicator position in the display section 40) using a nonlinear function (a quadratic expression) or by interpolation of two straight lines. This enables a scale panel image and an indicator image (level image) which is obtained by converting the signal level of a sound signal into the indicator position to be displayed. Therefore, the rate of change in indicator position can be changed in a particular signal level range.

It goes without saying that although in the above described first and second embodiments, the level meter displaying method is executed in accordance with programs stored in the ROM 50, the object of the present invention may also be accomplished by supplying a system or an apparatus with a storage medium (or a recording medium) in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of either of the above-mentioned embodiments on a computer, and the form of the program may be an object code, a program executed by an interpreter, or script data supplied to an OS.

Examples of the storage medium for supplying the program code include a floppy (registered trademark) disk, a hard disk, an optical disk, a magnetic-optical disk, a CD-ROM, an MO, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

What is claimed is:

1. A level meter displaying method of displaying a level meter on a display of a device to which a sound signal is input, the level meter comprising a Volume Unit (VU) meter used in an audio equipment, the method comprising:

a displaying step of displaying on the display a scale image obtained according to a single nonlinear function which nonlinearly varies with a signal level of the sound signal, the function being defined for the whole display range of the signal level such that as the signal level becomes lower, a gradient as a rate of change of an indicator angle or indicator position of the level meter increases, the scale image comprising an unequally-spaced scale calibrated at positions varying with a plurality of pre-determined signal levels based on the function;

a converting step of converting the signal level of the sound signal into an indicator angle or indicator position of the level meter according to the function; and a level image displaying step of displaying on the display a level image corresponding to the indicator angle or indicator position obtained in said converting step, wherein the function is an nth order function determined by not less than n+1 points of the signal level of the sound signal and the indicator angle or the indicator position, wherein n is a natural number of not less than 2.

2. A level meter displaying method according to claim 1, comprising a setting step of setting a right angle with respect to a horizontal position of the level meter for an average signal level of the sound signal.

3. A level meter displaying method according to claim 2, wherein said setting step comprises setting respective predetermined angles with respect to the horizontal position of the level meter for a maximum signal level and a minimum signal level of the sound signal.

4. A level meter displaying method according to claim 3, wherein the function is a nonlinear function which generates a curve passing through three points consisting of the maximum signal level, the average signal level, and the minimum signal level of the sound signal.

5. A level meter displaying method according to claim 4, wherein the nonlinear function is a function comprising two straight lines, and a curve which is obtained by interpolating the two straight lines.

6. A level meter apparatus comprising:
- a display section that displays a level meter, the level meter comprising a Volume Unit (VU) meter used in an audio equipment;
- an input section to which a sound signal is externally input;
- a scale display section that displays on said display section a scale image obtained according to a single nonlinear function which nonlinearly varies with a signal level of the sound signal, the function being defined for the whole display range of the signal level such that as the signal level becomes lower, a gradient as a rate of change of an indicator angle or indicator position of the level meter increases, the scale image comprising an unequally-spaced scale calibrated at positions varying with a plurality of pre-determined signal levels based on the function;
- a converting section that converts the signal level of the sound signal into an indicator angle or indicator position of the level meter according to the function; and
- a level image display section that displays on said display section a level image corresponding to the indicator angle or indicator position obtained by said converting section,
- wherein the function is an nth order function determined by not less than n+1 points of the signal level of the sound signal and the indicator angle or the indicator position, wherein n is a natural number of not less than 2.

7. A level meter apparatus according to claim 6, comprising a setting section that sets a right angle with respect to a horizontal position of the level meter for an average signal level of the sound signal.

8. A level meter apparatus according to claim 7, wherein said setting section sets setting respective predetermined angles with respect to the horizontal position of the level meter for a maximum signal level and a minimum signal level of the sound signal.

9. A level meter apparatus according to claim 8, wherein the function is a nonlinear function which generates a curve passing through three points consisting of the maximum signal level, the average signal level, and the minimum signal level of the sound signal.

10. A level meter apparatus according to claim 9, wherein the nonlinear function is a function comprising two straight lines, and a curve which is obtained by interpolating the two straight lines.

11. A method for converting sound signal inputs into different indicator angles of a level meter that displays a Volume Unit (VU) meter image representative of the converted indicator angles, the method comprising:
- setting at least three sound signal levels comprising a minimum signal level, an average signal level and a maximal signal level, each sound signal level corresponding to a unique pre-defined indicator angle to be displayed on the VU meter;
- determining a single nonlinear quadratic function based on the three sound signals and their corresponding indicator angles;
- displaying on the VU meter a scale panel image obtained according to the function, the scale panel image having unequally-spaced character strings calibrated at positions indicating various signal levels;
- receiving a sound signal input and converting the input into an indicator angle according to the function; and
- displaying on the VU meter an indicator image corresponding to the indicator angle indicative of a level of the input sound signal.

* * * * *